Aug. 26, 1969 R. D. GANTT ET AL 3,463,881

NOISE-GATED SYNC SEPARATOR AND AGC FOR TELEVISION RECEIVER

Filed March 28, 1967

INVENTORS
ROBERT D. GANTT,
ROBERT C. WHEELER

BY

Robert E. Strauss

ATTORNEY

United States Patent Office 3,463,881
Patented Aug. 26, 1969

3,463,881
NOISE-GATED SYNC SEPARATOR AND AGC FOR TELEVISION RECEIVER

Robert Dwight Gantt and Robert Charles Wheeler, Batavia, N.Y., assignors to Sylvania Electric Products Inc., a corporation of Delaware Filed Mar. 28, 1967, Ser. No. 626,444
Int. Cl. H04n *3/16, 5/38*
U.S. Cl. 178—7.3 11 Claims

ABSTRACT OF THE DISCLOSURE

Noise-gating of the synchronizing pulse separation and automatic gain control circuitry in a television receiver is accomplished by providing a means for amplifying and limiting noise signals of a magnitude greater than the magnitude of the synchronizing pulse signals of a composite video signal and switching means coupling said synchronizing pulse separation and automatic gain control circuitry to circuit ground and responsive to said amplified and limited noise signals to reduce conduction through said synchronizing pulse separation and automatic gain control circuitry. The means for amplifying and limiting the noise signals includes an amplifying and limiting means having a given conduction bias level and means for altering the magnitude of the conduction bias level and the synchronizing pulse signals with respect to one another such that the conduction bias level is of a magnitude slightly greater than the synchronizing pulse signals. Also, means are provided for dynamically altering the magnitude of the conduction bias level and synchronizing pulse signals with respect to one another.

BACKGROUND OF THE INVENTION

Television receivers normally included some means for developing a composite video signal which includes synchronizing pulse signals and may include undesired noise signals. Also, the receivers ordinarily include a means for separating the synchronizing pulse signals from the composite video signals and a means for developing an automatic gain control (AGC) signal. Moreover, the receivers usually include some means for protecting the synchronizing pusle separation and AGC means from the deleterious effects of the undesired noise signals in the composite video signals.

Although numerous noise protection techniques have been employed, one of the better methods utilized may be referred to as the noise inverter principle. In this method, a vacuum tube is used to clip, amplify, and invert noise signals in the composite video signal which are of an amplitude greater than the synchronizing pulse signals. The signals available from the vacuum tube are fed back and combined with the original composite video signal wherefrom they were derived to effect cancellation of the original noise signals and provide a gated video signal which is applied to the synchronizing pulse separation and AGC circuitry.

An improved noise protection method frequently employed is the so-called "noise switch" technique. Therein, a switch means, usually in the form of a transistor, is placed in the cathode circuit of the stage or stages to be protected. The transistor is biased for full conduction during normal operation and a noise signal applied to the transistor drives the transistor to cut off for the duration of the noise which, in turn, essentially opens the circuitry of or reduces conduction through the stages being protected. Thus, that portion of an applied composite video signal whereat the noise signals would normally appear is "gated" or removed and a desired gated video signal provided.

While the above-described technique has been and still is extensively used in present-day television receivers and has provided reasonably satisfactory results, it has been found that the system is not completely satisfactory for a number of reasons. For example, one source of noise signals frequently employed to operate the switch means or transistor is the screen grid of an Intermediate Frequency (IF) amplifier stage in the signal receiver. However, the signals obtainable from the screen grid of the IF amplifier stage are usually of insufficient magnitude to operate the switch means in a satisfactory manner and also represent only noise signals having an amplitude sufficient to drive the IF stage into grid current. Since much of the noise is of a magnitude slightly greater than the "tips" of the synchronizing pulse signals but less than required to drive the IF stage into grid current, the above-mentioned noise signals of relatively small magnitude do not provide a control signal of sufficient magnitude to drive the transistor switch to a cutoff condition. Thus, the synchronizing pulse separation and AGC means will be undesirably "backed off" or the bias thereon increased due to increased conduction caused by the above-mentioned noise signals of relatively small magnitude.

Another noise signal source is the noise detected by the video or sound detector. In this instance, the problems are to obtain noise signals of sufficient magnitude to effectively operate the noise switch, to separate the noise signals from the composite video signal without deleterious effects upon the synchronizing pulse signals, and to accomplish this noise signal separation without undesirably reverse or forward biasing the detectors. Previous methods employed a germanium-type transistor for the noise switch whereby a very small amount of undesired bias potential, about 0.2 volt D.C., was applied to the detection system. However, the load resistance of the detector stage in such a system was unpredictable due to the series connected fixed load resistance and the relatively low but variable resistance of the switching transistor.

Further, it was found that the arrival of the relatively inexpensive and readily available silicon-type transistor provided no solution in so far as cost or operation of the known "switch-type" circuitry was employed. In this instance, the switch transistor inherently provides a much higher undesired bias potential, about 0.7 volt D.C., on the detection system and such an increased bias potential in combination with the fixed load resistance was found to be intolerable. In other words, conduction of the switch transistor, which occurs under normal operation, causes an undesired increased biasing of the detection system which, in turn, causes undesired clipping of the video signals.

OBJECTS AND SUMMARY OF THE INVENTION

It is therefore an object of the present invention to enhance the noise-gating capability of a television receiver. Another object of the invention is to provide improved circuitry for noise-gating the synchronizing pulse separation and automatic gain control (AGC) means of a television receiver. Still another object of the invention is to provide an improved source of noise signals without deleterious effect upon the circuitry wherefrom the noise signals are obtained. A further object of the invention is to provide an enhanced noise-gating system which automatically tracks alterations in signal level. Still another object of the invention is to provide simple, inexpensive, easily adjusted noise-gating circuitry having relatively few components and providing enhanced noise protection performance.

These and other objects and advantages are achieved in one aspect of the invention by utilizing a means for providing amplified and limited noise signals and applying these amplified and limited noise signals to a switching means to cause reduced conduction through the synchronizing pulse separation and automatic gain control circuitry during the presence of noise signals in a composite video signal. Also, the means for providing amplified and limited noise signals includes an amplifying and limiting means having a given conduction bias level and means for altering the magnitude of the given conduction bias level and the synchronizing pulse signals with respect to one another such that the conduction bias level is of a greater magnitude than the "tips" of the synchronizing pulse signals.

DESCRIPTION OF THE PREFERRED EMBODIMENT

The following disclosure in conjunction with the accompanying drawings and appended claims will serve to provide a better understanding of the present invention as well as other and further objects, advantages, and capabilities thereof.

Figure 1:
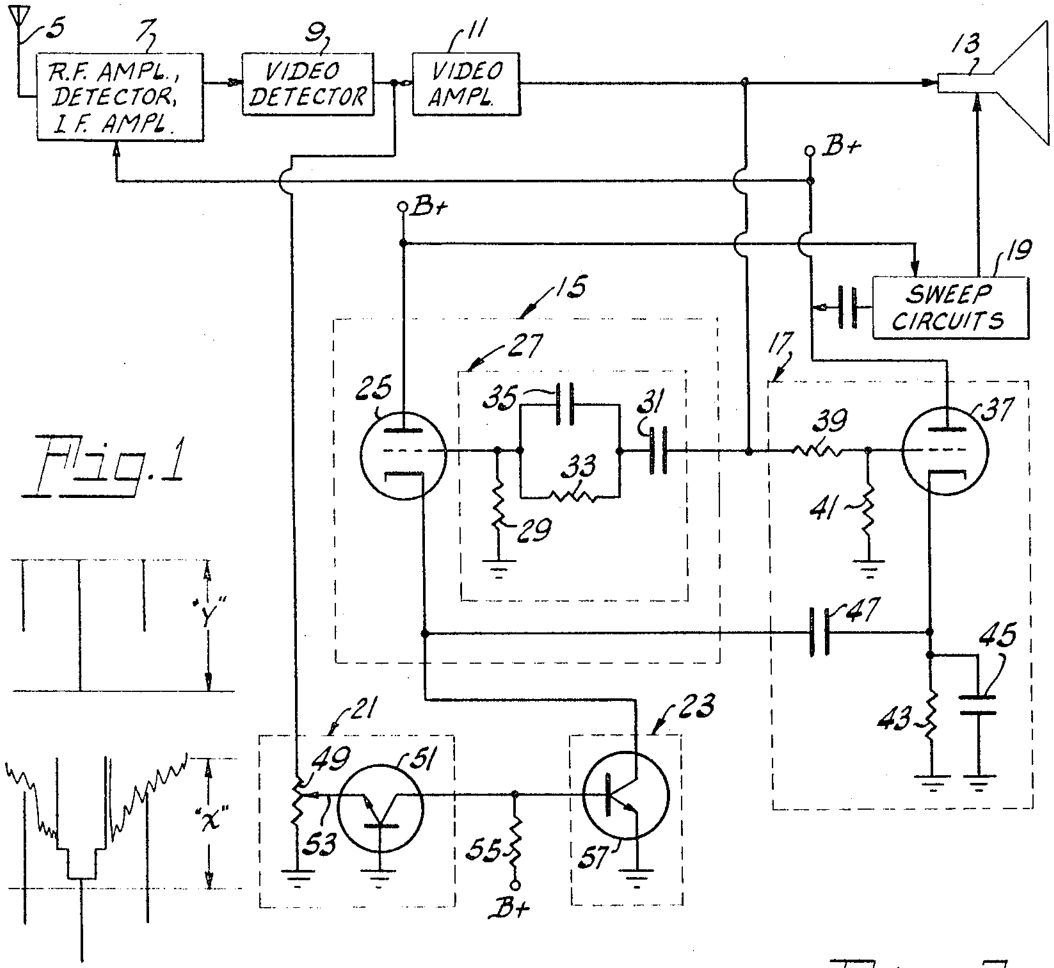
FIG. 1 is a diagrammatic illustration, in block and schematic form, employing one embodiment of the invention.

Referring to the drawings, FIG. 1 illustrates, in block and schematic form, a television receiver employing one embodiment of the invention. The receiver includes the usual antenna 5, RF amplification and detection stages and IF amplification stages 7, a video detection stage 9, a video amplification stage 11, and an image reproducer or picture tube 13. Since all of the above-listed stages are well known in the art, further explanation thereof is believed to be unnecessary.

Coupled to the output of the video amplification stages 11 is a synchronizing pulse separation means 15 and an automatic gain control (AGC) means 17. Also, an output signal from the synchronizing pulse separation means 15 is applied to sweep circuitry 19 which is coupled to and controls the operation of the picture tube 13. Further, a "gating" signal from the sweep circuitry 19 is applied to the AGC means 17 to control the operation thereof and wherefrom a control signal is coupled back to and controls the gain of the RF and IF amplification stages 7.

Also, the output of the video detector stage 9 is coupled to an amplifier and limiter means 21. This amplifier and limiter means 21 is, in turn, coupled to a switching means 23 connected intermediate circuit ground and the synchronizing pulse separation means 15 and AGC means 17. Thus, the synchronizing pulse separation means 15 and AGC means 17 are dependent not only upon the signals available from the video amplification stages 11 but also from the video detection stage 9.

More specifically, the synchronizing pulse separation means 15 is illustrated in the form of an electron discharge device 25 having the usual anode, control grid, and cathode electrodes. Obviously, numerous solid state devices are equally applicable and appropriate replacements for the discharge device 25. The anode is connected to a voltage source B+ as well as to the sweep circuitry 19 and provides the well-known synchronizing signals therefore. The control grid is coupled to the output of the video amplifier stages 11 via a bias developing network 27 which includes a relatively long time constant network consisting of a resistor 29 and capacitor 31 and a relatively short time constant network consisting of a resistor 33 and a capacitor 35. This bias developing network 27 is commonly used in the art and serves to bias the discharge device 25 to nonconduction for all signals except those which exceed the level of the well-known blanking signal common to a composite video signal. The cathode is coupled to circuit ground via the switching means 23 as will be explained hereinafter.

The AGC means 17 is also illustrated as an electron discharge device 37 having anode, control grid, and cathode electrodes. The anode is coupled to a voltage source B+ and provides an output signal which is coupled back to and serves to control the gain of the RF and IF amplification stages 7. Also, a positive-going retrace pulse or "gating" signal available in the sweep circuitry 19 is applied to and controls the availability of output signals from the discharge device 37.

The control grid of the AGC means 17 is coupled to the junction of a pair of isolating resistors 39 and 41 series connected intermediate the junction of the video amplification stage 11 and synchronizing pulse separation means 15 and circuit ground. These isolating resistors 39 and 41 tend to inhibit any deleterious effect upon the amplification stage 11 and the synchronizing pulse separation means 15 by the AGC means 17.

The cathode of the AGC means 17 is coupled to circuit ground via a resistor 43 shunted by a capacitor 45. Also, the cathode is coupled by way of a capacitor 47 to the cathode of the synchronizing pulse separation means 15.

A composite video signal available at the output of the video detector stage 9 is coupled to the amplifier limiter means 21. The amplifier limiter means 21 includes an alterable resistor 49 connected intermediate the detector stage 9 and circuit ground and a transistor 51 having the usual base, emitter, and collector. The base is connected directly to circuit ground and the emitter is coupled to the adjustable arm 53 of the alterable resistor 49. The collector of the transistor 51 is coupled via a resistor 55 to a voltage source B+ and to the base of the transistor 57 of the switching means 23. Also, the transistor 57 of the switching means 23 has an emitter connected directly to circuit ground and a collector connected directly to the cathode of the discharge device 25 of the synchronizing pulse separation means 15 and via a capacitor 47 to the cathode of the discharge device 37 of the AGC means 17.

As to the operation, the video detector stage 9 provides a composite video signal which includes synchronizing pulse signals and may include undesired noise signals having a magnitude greater than tthe magnitude of the synchronizing pulse signals. This composite video signal available from the detector stage 9 is applied via the video amplifier stage 11 to the synchronizing pulse separation means 15 and to the AGC means 17. Also, the composite video signal from the detector stage 9 is applied to the amplifier limiter means 21.

Assuming an operational condition wherein the composite video signal available from tthe video detector stage 9 does not include noise signals having an amplitude greater than the synchronizing pulse signals and the signal is negative-going in phase. This negative-going composite video signal is applied to the video amplification stage 11 wherein signal amplification and phase inversion is provided in a well-known manner. The resultant amplified and phase inverted positive-going composite video signal is applied to the synchronizing pulse separation means 15 and the AGC means 17.

At the same time, the negative-going composite video signal available from the video detector stage 9 is applied to the amplifier limiter means 21. The amplifier limiter means 21 includes the alterable resistor 49 having an adjustable arm 53. This adjustable arm 53 is positioned to select a portion of the composite video signal applied to the alterable resistor 49 and this signal portion includes synchronizing pulse signals of a magnitude less than the conduction bias or threshold level X of the transistor 51. Thus, the amplifier limiter means 21 is rendered operable by noise signals of a magnitude greater than the conduction bias level X of the transistor 51 and appears as an open circuit, in so far as the detector stage 9 is concerned, for signals of a magnitude less than the magnitude of the conduction bias level X of the transistor 51.

Also, the transistor 57 of the switching means 23 is biased to a conductive state by the voltage source B+ coupled via the resistor 55 to the base thereof. In other words, the switching means 23 is biased to a substantially saturated conduction state and appears essentially as a short circuit to ground in so far as the synchronizing pulse separation means 15 and AGC means 17 is concerned when the composite video signal does not include noise signals of a magnitude greater than the conduction bias level X of the transistor 51.

Thus, the positive-going composite video signal applied to the synchronizing pulse separation means 15 via the bias development means 27 causes development of a bias level substantially at the well-known blanking level of the composite video signal whereupon the synchronizing pulse signals appear at the anode of the discharge device 25. These synchronizing pulse signals are, in turn, applied to the sweep circuitry 19.

Also, the AGC means 17 in response to the positive-going composite video signals applied thereto via the resistor 39 and the synchronizing pulse signals applied to the anode of the discharge device 37 from the sweep circuitry 19 provides a gain control signal. This gain control signal is, in turn, applied to the RF and IF stages 7 and serves to control the magnitude of the signal available therefrom.

Now, when the composite video signal includes noise signals of a magnitude greater than the magnitude of the synchronizing pulse signals, the positive-going noise signals will arrive at the bias development means 27 and tend to cause an increased current flow through the discharge device 25. This increased current flow will tend to cause development of an increased bias level or "backing off" of the discharge device 25. Thus, separation of the synchronizing pulse signals from the composite video signal will be inhibited, the discharge device 25 will tend to respond to the noise signals, and synchronization of the receiver will be deleteriously affected.

Similarly, the noise signals will appear at the control grid of the AGC means 17 which will tend to increase conduction therethrough and vary the voltages applied to the RF and IF amplification stages 7 in accordance with the noise signals rather than the synchronizing pulse signals. Thus, a cumulative deterioration of the signal to noise ratio of the receiver will result.

However, the negative-going composite video signal applied to the amplifier limiter means 21 also includes noise signals coincident in time with the above-mentioned positive-going noise signals applied to the synchronizing pulse separation means 15 and AGC means 17. Since the transistor 51 has a conduction bias or threshold level X slightly greater than the magnitude of the synchronizing pulse signals, only that portion of the noise signals of a magnitude greater than the conduction bias level X of the transistor 51 is sufficient to render the transistor 51 conductive. Also, the transistor 51 has the capability of amplifying relatively weak noise signals above the conduction bias level X as well as the capability, due to the collector to base conduction bias level Y, for limiting the magnitude of the noise signals available therefrom in response to applied relatively strong noise signals.

The noise signals available from the transistor 51 overcome the bias level of the transistor 57 as provided by the voltage source B+ via the resistor 55 and, for all practical purposes, drive the transistor 57 to a cut-off condition. Since the cut-off condition of the transistor 57 is coincident in time with the arrival of the positive-going noise signals at the control grid of the discharge device 25 of the synchronizing pulse separation means 15, an increase in current flow and an increased bias development caused by the positive-going noise signals is prohibited and separation of the synchronizing pulse signals is accomplished without deleterious effects due to the noise signals.

Also, the cut-off condition of the transistor 57 provides positive-going pulse signals which are coupled to the base of the transistor 37 of the AGC means 17 by way of the capacitor 47. Again, the arrival of these positive-going pulse signals at the cathode of the discharge device 37, in time coincidence with the arrival of the positive-going noise signals at the control grid of the discharge device 37, tend to substantially provide a compensating effect such that the resultant signal from the AGC means 17 is substantially unaffected by the noise signals.

Figures 2, 3:
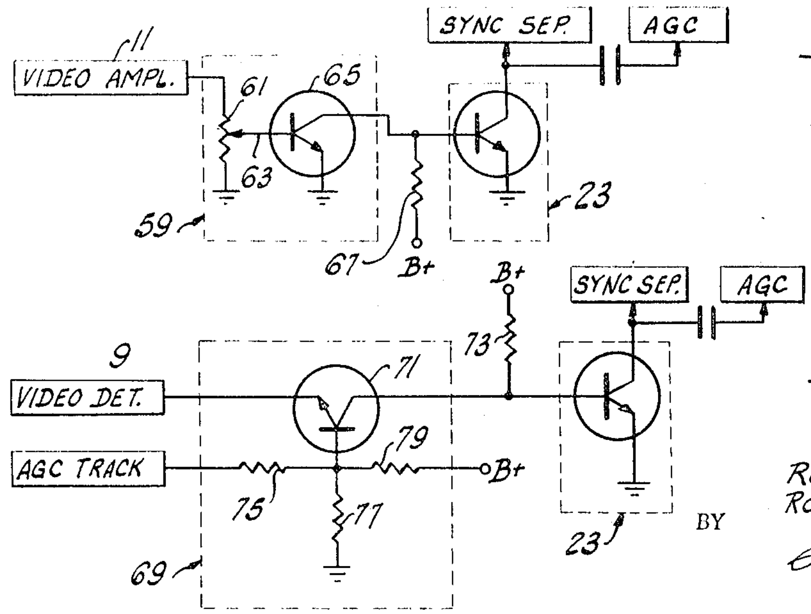
FIG. 2 is a schematic illustration of another embodiment of the invention.
FIG. 3 is a schematic illustration of still another embodiment of the invention.

FIG. 2 illustrates an alternative arrangement wherein the amplifier limiter means 59 includes an alterable resistor 61 coupling the video amplifier stage 11 to circuit ground. The alterable resistor 61 includes an adjustable arm 63 which is coupled to the base of a transistor 65 having an emitter connected to circuit ground and a collector coupled to a voltage source B+ by a resistor 67 and to the switching means 13.

The arrangement of FIG. 2 is similar in operation to the above discussed arrangement of FIG. 1 except for the polarity of the composite video signal applied to the amplifier limiter means 59. Herein, the applied composite video signal is of positive-going polarity and a portion thereof is selected, by positioning the alterable arm 63, such that the "tips" of the synchronizing pulse signals are of a magnitude slightly less than the conduction bias or threshold level X of the transistor 65. As discussed above, that portion of the noise signals greater than the conduction bias level X is amplified or limited by the transistor 65 and applied to the switching means 23.

Additionally, FIG. 3 illustrates an arrangement wherein the driver limiter means 69 includes a transistor 71 having an emitter coupled to a video detector stage 9, a collector coupled to a voltage source B+ by a resistor 73 and to the switching means 23, and a base coupled by a first resistor 75 to an AGC tracking voltage source in the receiver such as the AGC controlled IF stages 7, a second resistor 77 to circuit ground, and a third resistor 79 to a voltage source B+.

The operation of the arrangement of FIG. 3 is somewhat similar to the arrangement of FIG. 1 in that the conduction bias or threshold level X of the transistor 71 is of a slightly greater magnitude than the magnitude of the synchronizing pulse signals. As distinct from the arrangement of FIG. 1 wherein a portion of the applied signal was selected by the adjustable tap 53 of the alterable resistor 49, the arrangement of FIG. 3 provides a source B+ of bias potential for the transistor 71 whereby the conduction bias or threshold level X is raised to a magnitude slightly greater than the magnitude of the synchronizing pulse signals available from the video detector stage 9 and applied to the emitter of the transistor 71.

Further, the base of the transistor 71 is coupled by a resistor 75 to an AGC tracking source which may be in the RF and IF stages 7 of the receiver for example. In this manner the conduction bias or threshold level X of the transistor 71 is dynamically altered in accordance with variations in the developed AGC signals which, in turn, are dependent upon the strength of the signals intercepted by the antenna 5.

Thus, there has been provided improved circuitry for separating synchronizing pulse signals and developing AGC signals from composite video signals which include noise signals of a magnitude greater than the magnitude of the synchronizing pulse signals. The circuitry is simple, inexpensive, requires few components, and a minimum of adjustments. Further, the circuitry provides noise protection or performance which is believed to be unobtainable in other known circuitry and accomplishes this performance without deleterious effect upon the energizing signal source. Also, the circuitry provides a more positive "gating" action due to signal amplification of relatively weak noise signals and serves as a protection device for a switching means by limiting the magnitude of noise signals available from the amplifier limiter means upon application thereto of applied relatively strong noise signals. Moreover, the circuitry includes means for dynamic alterations in accordance with variations in strength of a received signal.

While there have been shown and described what are at present considered the preferred embodiments of the invention, it will be obvious to those skilled in the art that various changes and modifications may be made therein without departing from the scope of the invention as defined by the appended claims.

We claim:

1. In a television receiver having synchronizing pulse separation means and automatic gain control means coupled to a source of composite video signals which include synchronizing pulse signals and may include undesired noise signals of a magnitude greater than the synchronizing pulse signals, noise-gating circuitry comprising in combination:

means coupled to the composite video signal source and responsive to noise signals of a magnitude greater than the magnitude of the synchronizing pulse signals to provide amplified and limited noise signals; and switching means coupling said synchronizing pulse separation means and said automatic gain control means to circuit ground and responsive to said amplified and limited noise signals to cause reduced conduction through said synchronizing pulse separation means and said automatic gain control means.

2. The noise-gating circuitry of claim 1 wherein said means for providing amplified and limited noise signals includes means for amplifying and limiting said noise signals, said means having a given conduction bias level, and means for altering said given conduction level and said composite video signal level with respect to one another such that the magnitude of said conduction bias level is slightly greater than the magnitude of the synchronizing pulse signals of said composite video signals.

3. The noise-gating circuitry of claim 1 wherein said means for providing amplified and limited noise signals includes means for amplifying and limiting said noise signals, said means having a given conduction bias level, and signal reducing means coupling said amplifying and limiting means to said composite video signal source, said reducing means providing a composite video signal having synchronizing pulse signals of a magnitude less than the magnitude of said given conduction bias level.

4. The noise-gating circuitry of claim 1 wherein said means for providing amplified and limited noise signals includes means for amplifying and limiting said noise signals, said means having a given conduction bias level, and means coupled to said amplifying and limiting means for altering said given conduction bias level to a level slightly greater than the magnitude of the synchronizing pulse signals of said composite video signal.

5. The noise-gating circuitry of claim 1 wherein said means for providing amplified and limited noise signals includes an amplifying and limiting means in the form of a transistor having a given forward bias conduction level and alterable resistance means coupled to said composite video signal source and to said transistor, said resistance means reducing said composite video signal to a level such that the magnitude of the synchronizing pulse signals therein is slightly less than the magnitude of said given forward bias conduction level.

6. The noise-gating circuitry of claim 1 wherein said means for providing amplified and limited noise signals includes an amplifying and limiting means in the form of a transistor having a given forward bias conduction level coupled to said composite video signal source, and a potential source coupled to said amplifying and limiting means, said potential source increasing the magnitude of said forward bias conduction level to a value greater than the magnitude of the synchronizing pulse signals of said composite video signals.

7. The noise-gating circuitry of claim 1 wherein said means for providing amplified and limited noise signals includes an alterable resistor having an adjustable arm and a transistor having an emitter, base, and collector, said alterable resistor coupling the composite video signal source to circuit ground, said emitter being coupled to said adjustable arm, said base being connected to circuit ground, and said collector being coupled to a voltage source and to said switching means.

8. The noise-gating circuitry of claim 1 wherein said means for providing amplified and limited noise signals includes a voltage source and a transistor having an emitter, base, and collector, said emitter being coupled to the composite video signal source, said base coupled to said voltage source, and said collector coupled to a voltage supply and to said switching means.

9. The noise-gating circuitry of claim 1 wherein said means for providing amplified and limited noise signals includes means for amplifying and limiting said noise signals coupled to the composite video signal source, said means having a given conduction bias level, and means for dynamically altering the magnitude of said given conduction bias level with respect to the magnitude of the synchronizing pulse signals of said composite video signals, said dynamic altering means being coupled to said amplifying and limiting means and to a source of dynamically varying signals of said receiver.

10. The noise-gating circuitry of claim 1 wherein said means for providing amplified and limited noise signals includes amplifying and limiting means coupling the composite video signal source and said switching means and conduction bias altering means coupling said amplifying means to circuit ground and to a fixed voltage supply and to a dynamically varying signal source of said receiver.

11. The noise-gating circuitry of claim 1 wherein said means for providing amplified and limited noise signals includes an alterable resistor having an adjustable arm and a silicon-type transistor having an emitter, base, and collector, said alterable resistor coupling the composite video signal source to circuit ground, said adjustable arm being coupled to the emitter of said transistor, said base of said transistor being connected to circuit ground, and said collector of said transistor being coupled to a voltage source and to said switching means, and said switching means being in the form of a silicon-type transistor having an emitter connected to circuit ground and a collector connected to said synchronizing pulse separation means and to said automatic gain control means.

References Cited

UNITED STATES PATENTS

| | | | |
|---|---|---|---|
| 2,736,769 | 2/1956 | Macovski | 178—7.3 |
| 2,880,271 | 3/1959 | Kroger | 178—7.3 |
| 3,109,061 | 10/1963 | Kramer | 178—7.3 |
| 3,256,502 | 6/1966 | Momberger | 178—7.3 |

ROBERT L. GRIFFIN, Primary Examiner

R. L. RICHARDSON, Assistant Examiner